US012162271B2

(12) United States Patent
Nomoto et al.

(10) Patent No.: US 12,162,271 B2
(45) Date of Patent: Dec. 10, 2024

(54) RECORDING APPARATUS

(71) Applicant: SEIKO EPSON CORPORATION, Tokyo (JP)

(72) Inventors: Nobuhisa Nomoto, Matsumoto (JP); Toshihiro Kumagai, Shiojiri (JP); Masaharu Iwamoto, Shiojiri (JP); Keiichi Okamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 17/645,665

(22) Filed: Dec. 22, 2021

(65) Prior Publication Data

US 2022/0203717 A1 Jun. 30, 2022

(30) Foreign Application Priority Data

Dec. 25, 2020 (JP) ................................ 2020-216434

(51) Int. Cl.

| | |
|---|---|
| ***B41J 2/01*** | (2006.01) |
| ***B41J 11/00*** | (2006.01) |
| ***B41J 11/04*** | (2006.01) |
| ***B41J 11/24*** | (2006.01) |
| ***B41J 11/58*** | (2006.01) |
| ***B41J 13/00*** | (2006.01) |

(Continued)

(52) U.S. Cl.

CPC ............. *B41J 13/0054* (2013.01); *B41J 2/01* (2013.01); *B41J 11/007* (2013.01); *B41J 11/04* (2013.01); *B41J 11/24* (2013.01); *B41J 11/58* (2013.01); *B41J 13/0018* (2013.01); *B41J 13/076* (2013.01); *B41J 13/08* (2013.01)

(58) Field of Classification Search

CPC ... B41J 2/01; B41J 11/007; B41J 11/24; B41J 11/58; B41J 13/0018; B41J 13/0054; B41J 13/03; B41J 13/076; B41J 13/08; B41J 13/103

See application file for complete search history.

(56) References Cited

U.S. PATENT DOCUMENTS 5,172,903 A 12/1992 Haneda et al.
9,857,748 B2 1/2018 Koga et al.
(Continued)

FOREIGN PATENT DOCUMENTS

JP H04-148733 5/1992
JP 2004-217330 8/2004
(Continued)

*Primary Examiner* — Justin Seo
*Assistant Examiner* — Kendrick X Liu
(74) *Attorney, Agent, or Firm* — WORKMAN NYDEGGER

(57) ABSTRACT

There is provided a recording apparatus including: a medium support section that supports a medium before feeding; a feeding roller that sends out the medium; and an apparatus main body, in which the medium support section is configured to switch between a stored state of being stored in the apparatus main body and a protruding state, being a state where an upstream part in a feeding direction protrudes from a first side surface of the apparatus main body, in the protruding state of the medium support section, close to a second side surface, which is a side surface opposite to the first side surface, an assist roller that applies a sending force to the medium fed from the medium support section is provided upstream of the feeding roller in the feeding direction.

9 Claims, 10 Drawing Sheets

(51) Int. Cl.

| | |
|---|---|
| ***B41J 13/03*** | (2006.01) |
| ***B41J 13/076*** | (2006.01) |
| ***B41J 13/08*** | (2006.01) |
| ***B41J 13/10*** | (2006.01) |

(56) References Cited

U.S. PATENT DOCUMENTS

| | | | | |
|---|---|---|---|---|
| 2007/0145670 | A1* | 6/2007 | Asada | B65H 3/0676<br>271/117 |
| 2008/0150221 | A1* | 6/2008 | Sugiyama | B65H 3/0676<br>271/202 |
| 2009/0322844 | A1* | 12/2009 | Komuro | B41J 3/4071<br>347/104 |
| 2010/0124449 | A1* | 5/2010 | Asada | B65H 31/20<br>271/145 |
| 2015/0166275 | A1* | 6/2015 | Sato | B65H 3/0669<br>271/167 |
| 2017/0001815 | A1 | 1/2017 | Sai | |
| 2017/0003635 | A1 | 1/2017 | Koga | |
| 2018/0273316 | A1* | 9/2018 | Mimoto | H04N 1/00602 |

FOREIGN PATENT DOCUMENTS

| | | | |
|---|---|---|---|
| JP | 2012-236694 | | 12/2012 |
| JP | 2017-013955 | A | 1/2017 |
| JP | 2017-081674 | | 5/2017 |
| JP | 2018-090341 | | 6/2018 |
| JP | 2020-055651 | A | 4/2020 |
| JP | 2020-117404 | | 8/2020 |
| JP | 2020-158230 | A | 10/2020 |

* cited by examiner

RECORDING APPARATUS

The present application is based on, and claims priority from JP Application Serial Number 2020-216434, filed Dec. 25, 2020, the disclosure of which is hereby incorporated by reference herein in its entirety.

BACKGROUND

1. Technical Field

The present disclosure relates to a recording apparatus that performs recording on a medium.

2. Related Art

A recording apparatus represented by a printer may include a tray for feeding media from a side surface of the apparatus, in addition to a medium accommodating cassette that can be attached to and detached from the apparatus main body. As illustrated in JP-A-2017-013955, such a tray is rotatably provided on the side surface of the apparatus and is configured with a plurality of trays, and when using the tray, it is possible to use the tray by tilting down the entire tray, and to load a long sheet by further expanding the tray.

When feeding a long sheet in the above-described configuration, there is a concern that the sending force of the feeding roller is not sufficient and non-feeding occurs. However, the tray on which the sheet is loaded is rotatably provided on the side surface of the apparatus as described above and protrudes from the side surface of the apparatus. Therefore, it is not possible to provide an additional feeding unit.

SUMMARY

To solve the above problems, there is provided a recording apparatus according to the present disclosure including: a medium support section that forms a support surface that supports a medium before feeding; a feeding roller that sends out the medium supported by the medium support section in a feeding direction; and an apparatus main body including the medium support section and the feeding roller, in which the medium support section is configured to switch between a stored state of being stored in the apparatus main body and a protruding state where the support surface is in a state of being expanded from the stored state, the protruding state being a state where an upstream part in the feeding direction protrudes from a first side surface which is one of side surfaces that form a periphery of the apparatus main body, in the protruding state of the medium support section, a downstream end of the support surface in the feeding direction is at a position close to a second side surface, which is a side surface opposite to the first side surface, between the first side surface and the second side surface, and between the first side surface and the second side surface, an assist roller that applies a sending force to the medium fed from the medium support section is provided upstream of the feeding roller in the feeding direction.

DESCRIPTION OF EXEMPLARY EMBODIMENTS

Figure 1:
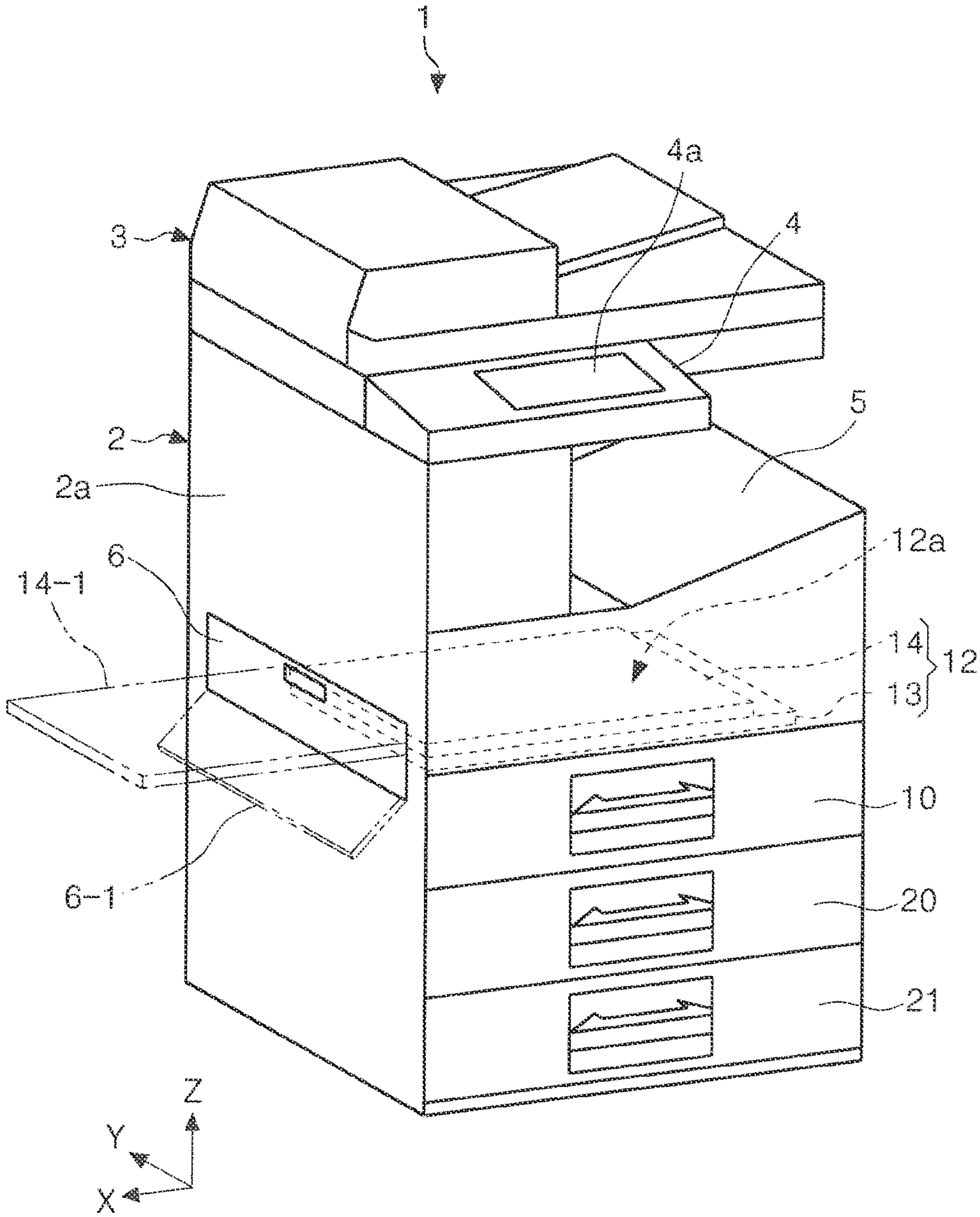
FIG. 1 is an external perspective view of a printer.

Hereinafter, the present disclosure will be schematically described.

According to a first aspect, there is provided a recording apparatus including: a medium support section that forms a support surface that supports a medium before feeding; a feeding roller that sends out the medium supported by the medium support section in a feeding direction; and an apparatus main body including the medium support section and the feeding roller, in which the medium support section is configured to switch between a stored state of being stored in the apparatus main body and a protruding state where the support surface is in a state of being expanded from the stored state, the protruding state being a state where an upstream part in the feeding direction protrudes from a first side surface which is one of side surfaces that form a periphery of the apparatus main body, in the protruding state of the medium support section, a downstream end of the support surface in the feeding direction is at a position close to a second side surface, which is a side surface opposite to the first side surface, between the first side surface and the second side surface, and between the first side surface and the second side surface, an assist roller that applies a sending force to the medium fed from the medium support section is provided upstream of the feeding roller in the feeding direction.

According to this aspect, in a configuration including the medium support section that can switch between the stored state and the protruding state where the support surface that supports the medium is in a state of being expanded from the stored state, the protruding state being a state where an upstream part in the feeding direction protrudes from a first side surface which is one of side surfaces that form a periphery of the apparatus main body, the downstream end of the support surface in the feeding direction is at a position close to the second side surface, which is a side surface opposite to the first side surface, between the first side surface and the second side surface. Therefore, the support surface extends in the feeding direction by utilizing the space in the apparatus main body. Therefore, in the protruding state of the medium support section, it is possible to suppress the protrusion amount of the medium support section from the first side surface, and accordingly, it is possible to feed a long medium while suppressing an installation space of the apparatus, and the usability of the apparatus is improved.

The medium support section is inserted into the apparatus main body as described above. Therefore, between the first side surface and the second side surface, that is, inside the apparatus main body, the assist roller that applies the sending force to the medium fed from the medium support section can be provided. Accordingly, it is possible to suppress a shortage of sending force when feeding a long medium, and it is possible to realize an appropriate feeding.

According to a second aspect, in the first aspect, the feeding roller and the assist roller are provided to be switchable between a contact state of being in contact with the medium supported by the medium support section and a separated state of being separated from the medium supported by the medium support section.

According to this aspect, the feeding roller and the assist roller are provided to be switchable between the contact state of being in contact with the medium supported by the medium support section and the separated state of being separated from the medium supported by the medium support section. Therefore, after the feeding of the medium is completed, by putting the feeding roller and the assist roller into the separated state, it is possible to avoid a case where the feeding roller and the assist roller cause a transport load of the medium.

According to a third aspect, in the second aspect, a separation roller pair provided downstream of the feeding roller in the feeding direction for nipping and separating the medium, is further provided, and a control section that controls rotation of the feeding roller and the assist roller switches the feeding roller and the assist roller from the contact state to the separated state when the front end of the medium sent out from the medium support section is nipped by the separation roller pair.

According to this aspect, when the front end of the medium sent out from the medium support section is nipped by the separation roller pair, the control section switches the feeding roller and the assist roller from the contact state to the separated state. Therefore, when the medium is transported by the separation roller pair, it is possible to avoid a case where the feeding roller and the assist roller cause a transport load of the medium.

According to a fourth aspect, in any one of the first to third aspects, a peripheral speed of the assist roller is set to be lower than a peripheral speed of the feeding roller.

According to this aspect, the peripheral speed of the assist roller is set to be lower than the peripheral speed of the feeding roller. Therefore, it is possible to suppress a case where the medium is excessively sent by the assist roller and the medium is bent between the feeding roller and the assist roller.

According to a fifth aspect, in the fourth aspect, a one-way clutch that idles the assist roller in a rotational direction when the medium is sent in the feeding direction, is further provided in a power transmission path between the power source of the assist roller and the assist roller.

According to this aspect, in the power transmission path between the power source of the assist roller and the assist roller, the one-way clutch that idles the assist roller in the rotational direction when the medium is sent in the feeding direction is provided. Therefore, it is possible to suppress a case where the assist roller becomes a transport load with respect to the medium sending by the feeding roller.

According to a sixth aspect, in any one of the first to fifth aspects, a medium accommodating cassette provided with a medium accommodation section for accommodating the medium is provided to be attachable to and detachable from the apparatus main body from a front surface side, and the medium support section is configured to protrude laterally with respect to the apparatus main body.

According to this aspect, the medium accommodating cassette is provided to be attachable to and detachable from the apparatus main body from the front surface side, and the medium support section can protrude laterally with respect to the apparatus main body. Therefore, while facilitating efficiency when attaching and detaching the medium accommodating cassette, even when the protrusion amount of the medium support section from the apparatus main body is ensured, the medium support section is unlikely to be an obstacle.

According to a seventh aspect, in any one of the first to fifth aspects, a medium accommodating cassette provided with a medium accommodation section for accommodating the medium is provided to be attachable to and detachable from the apparatus main body, and the medium support section is provided in the medium accommodating cassette.

According to this aspect, the medium accommodating cassette provided with the medium accommodation section for accommodating the medium is provided to be attachable to and detachable from the apparatus main body, and the medium support section is provided in the medium accommodating cassette. Therefore, jam treatment can be easily performed by removing the medium accommodating cassette when medium jam occurs inside the apparatus.

According to an eighth aspect, in the seventh aspect, the medium support section is slidably provided with respect to the medium accommodating cassette, and as the medium support section slides, the medium support section switches between the stored state and the protruding state.

According to this aspect, as the medium support section slides, the medium support section switches between the stored state and the protruding state. Therefore, it is possible to easily switch between the protruding state and the stored state.

According to a ninth aspect, in the eighth aspect, the feeding roller is provided to be displaceable in a direction of advancing and retreating with respect to the medium accommodating cassette, in the stored state of the medium support section, the medium is feedable from the medium accommodation section by the feeding roller, and in the protruding state of the medium support section, the medium is feedable from the medium support section by the feeding roller.

According to this aspect, the feeding roller is used both in sending out the medium from the medium support section and sending out the medium from the medium accommodation section. Therefore, it is possible to suppress an increase in the cost of the apparatus as compared with a configuration in which separated feeding rollers are provided for the medium support section and the medium accommodation section.

Hereinafter, the present disclosure will be specifically described.

Hereinafter, an ink jet printer 1 that performs recording by discharging ink, which is an example of a liquid, onto a medium represented by a recording paper sheet will be described as an example of a recording apparatus. Hereinafter, the ink jet printer 1 is abbreviated as a printer 1.

Furthermore, an X-Y-Z coordinate system illustrated in each drawing is a rectangular coordinate system, and a Y-axis direction is a width direction intersecting a transport direction of a medium, and is an apparatus depth direction. In the present embodiment, among the side surfaces that configure the periphery of an apparatus main body 2, a side surface in a +Y direction is a back surface and a side surface in a −Y direction is a front surface.

Further, an X-axis direction is an apparatus width direction, and when viewed from an operator of the printer 1, a side surface in a +X direction is a left side surface and a side surface in a −X direction is a right side surface. Hereinafter, among the side surfaces that configure the periphery of the apparatus main body 2, a side surface in the +X direction is referred to as a first side surface 2*a*, and a side surface in the −X direction is referred to as a second side surface 2*b*. Further, the −X direction is a medium sending-out direction from a lower medium setting section 11 and an upper medium setting section 12 that configure a first medium accommodating cassette 10 described later, and is a medium sending-out direction from a second medium accommodating cassette 20 and a third medium accommodating cassette 21.

A Z-axis direction is a vertical direction, that is, an apparatus height direction, and a +Z direction is an upward direction and a −Z direction is a downward direction.

In FIG. 1, the printer 1 includes a scanner section 3 which is an example of an image reading apparatus above the apparatus main body 2, that is, is configured as a multifunction device having a document reading function in addition to an ink jet recording function. An operation section 4 provided with a display section 4*a* for displaying various information is provided at the upper portion of the front surface of the apparatus.

The first medium accommodating cassette 10, the second medium accommodating cassette 20, and the third medium accommodating cassette 21 are provided to be attachable and detachable at the lower portion of the apparatus main body 2. In the present embodiment, each medium accommodating cassette is put into a mounted state by being pushed in the −Y direction from the front surface side of the apparatus, and can be removed by being pulled out in the +Y direction from the front surface side of the apparatus.

Furthermore, each medium accommodating cassette may be configured to be in the mounted state by being pushed in the −X direction from the left side surface of the apparatus main body 2, or may be configured to be in the mounted state by being pushed in the +X direction from the right side surface of the apparatus main body 2.

A side cover 6 is provided on the first side surface 2*a* which is a left side surface of the apparatus main body 2. The side cover 6 can be opened and closed by rotating around a rotation shaft 6*a* (refer to FIGS. 2 and 3) parallel to the Y-axis direction, opens an opening portion 2*c* (refer to FIG. 3) formed on the first side surface 2*a* by being opened as indicated by a reference numeral 6-1 and a two-dot chain line, and closes the opening portion 2*c* by being closed. When the side cover 6 is opened, the second support tray 14 of the upper medium setting section 12, which will be described later, protrudes from the first side surface 2*a* in the +X direction, and a support surface 12*a* that supports the medium can be expanded. In FIG. 1, a reference numeral 14-1 and a two-dot chain line indicate a second support tray that protrudes from the first side surface 2*a* in the +X direction.

The medium which is fed from each medium accommodating cassette and on which recording is performed is ejected toward the ejection tray 5 formed to be inclined upward in the −X direction.

Figure 2:
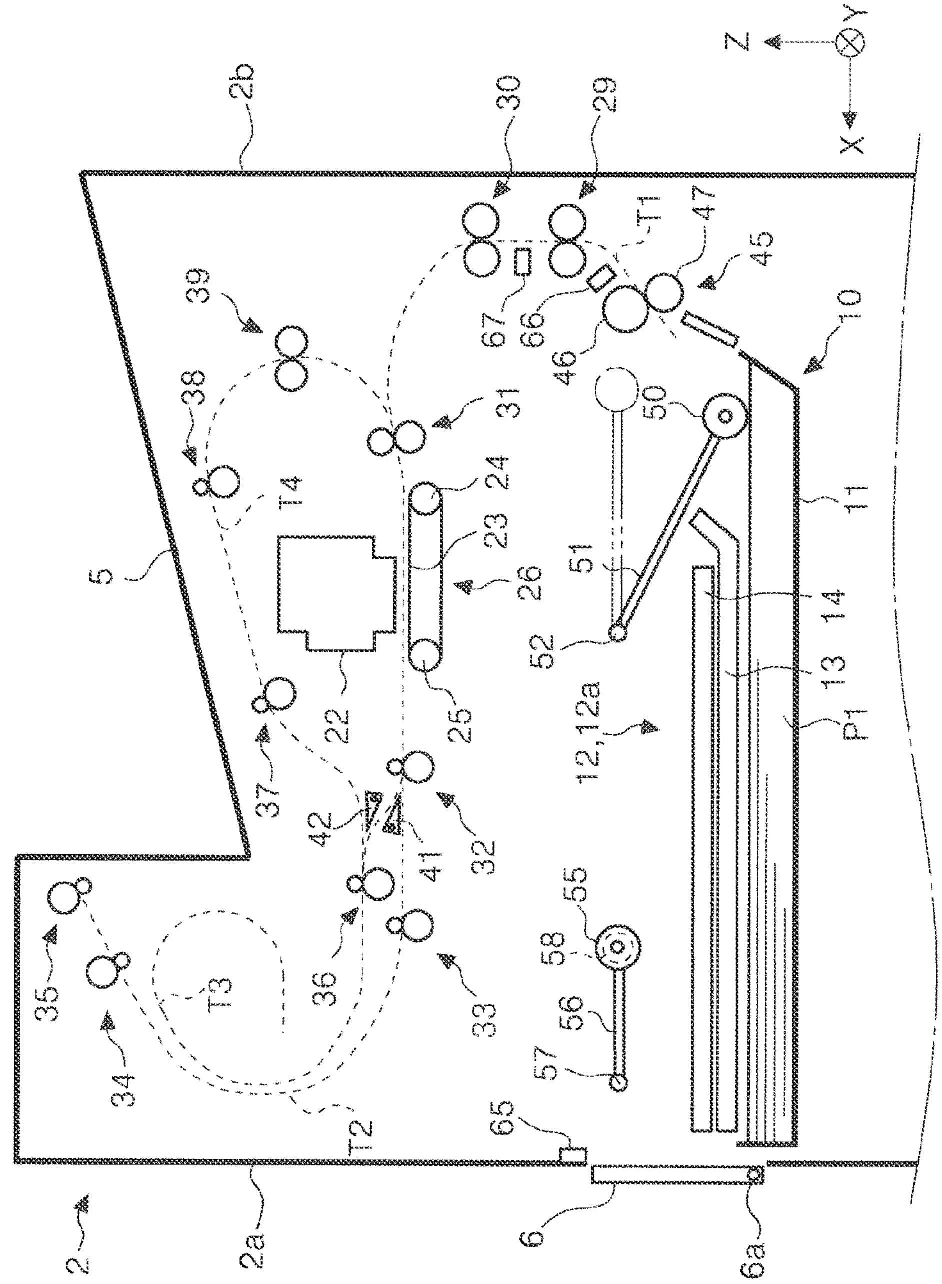
FIG. 2 is a view illustrating a medium transport path of the printer when an upper medium setting section is in a stored state.
Figure 3:
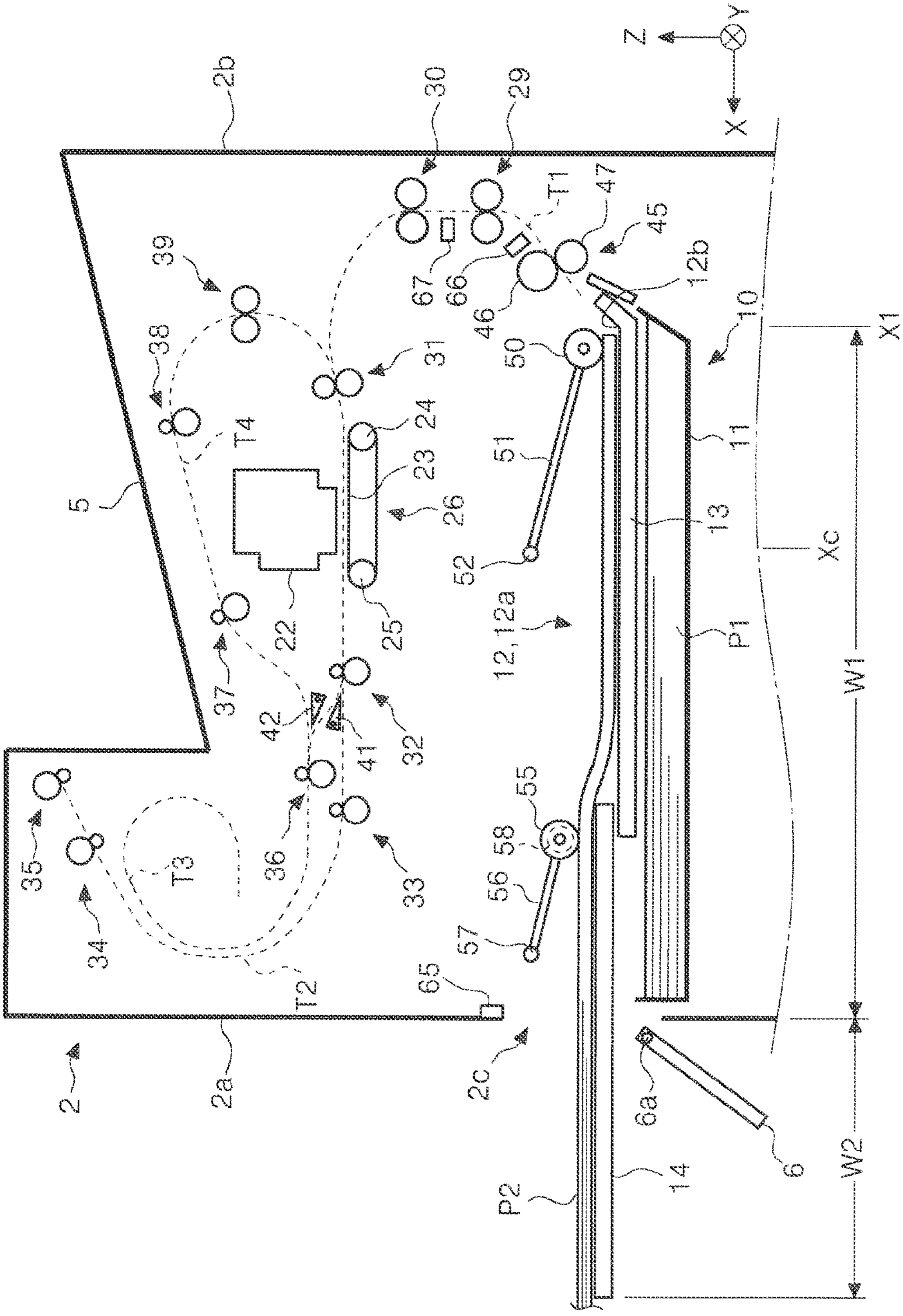
FIG. 3 is a view illustrating the medium transport path of the printer when the upper medium setting section is in a protruding state.

Subsequently, a medium transport path in the printer 1 will be described with reference to FIGS. 2 and 3. In FIGS. 2 and 3, the medium transport path is illustrated by a broken line. In the printer 1, the medium is transported through the medium transport path illustrated by the broken line. A reference numeral T1 indicates a medium feeding path from a separation roller pair 45 to a transport roller pair 31, a reference numeral T2 indicates a medium transport path from the transport roller pair 33 to a transport roller pair 35, a reference numeral T3 indicates a medium transport path in the +X direction from a transport roller pair 36, and a reference numeral T4 indicates a medium transport path in the −X direction from the transport roller pair 36 passing through the upper portion of a line head 22 to the transport roller pair 31.

Furthermore, in the following, the direction in which the medium is sent may be referred to as "downstream", and the opposite direction may be referred to as "upstream". Further, in FIGS. 2 and 3, a medium feeding path from the second medium accommodating cassette 20 and a medium feeding path from the third medium accommodating cassette 21 are not illustrated, but the medium feeding paths from the second medium accommodating cassette 20 and the third medium accommodating cassette 21 merge with a transport roller pair 29.

In FIGS. 2 and 3, a feeding roller 50 for sending out the set medium in the −X direction is provided for the first medium accommodating cassette 10. The feeding roller 50 is supported by an arm member 51. The arm member 51 is provided to be swingable around a rotation shaft 52 and swings, and accordingly, the feeding roller 50 advances and retreats with respect to the first medium accommodating cassette 10. An advancing/retreating direction of the feeding roller 50 with respect to the first medium accommodating cassette 10 is substantially along the Z axis.

Furthermore, one feeding roller 50 is provided so as to be in contact with a center position of the medium set in the first medium accommodating cassette 10 in the X-axis direction, that is, the medium width direction. However, a plurality of feeding rollers 50 may be provided along the medium width direction so that the feeding rollers 50 are in contact with the medium at a plurality of positions of which center positions are symmetrical in the medium width direction.

The separation roller pair 45 is provided downstream of the feeding roller 50. The separation roller pair 45 is configured with a driving roller 46 and a separation roller 47. The driving roller 46 is rotationally driven by a motor (not illustrated). The separation roller 47 can advance and retreat with respect to the driving roller 46, and is pressed toward the driving roller 46 by a pressing member (not illustrated).

The outer peripheral surface of the separation roller 47 is formed of an elastic material such as an elastomer, and is provided in a state where rotational torque is applied by a torque limiter (not illustrated). The medium to be double-fed along with the medium to be fed is stopped at the position of the separation roller pair 45 by the action of the separation roller 47.

A transport roller pair 29 is provided downstream of the separation roller pair 45, and a transport roller pair 30 is further provided downstream thereof. Further, the transport roller pair 31 is provided downstream of the transport roller pair 30. Furthermore, in the present specification, the "transport roller pair" is configured with a driving roller driven by a motor (not illustrated) and a driven roller that rotates in a driven manner while being in contact with the driving roller unless otherwise specified.

The medium that receives a sending force from the transport roller pair 31 is sent between the line head 22, which is an example of a recording unit, and a transport belt 23, that is, at a recording position facing the line head 22.

The line head 22 discharges ink, which is an example of a liquid, onto the surface of the medium to execute recording. The line head 22 is an ink discharge head configured such that a nozzle for discharging ink covers the entire area in the medium width direction, and is an ink discharge head capable of performing recording over the entire medium width without moving in the medium width direction. However, the ink discharge head is not limited thereto, and may be a type that is mounted on a carriage and discharges ink while moving in the medium width direction.

The transport belt 23 is an endless belt that is hung around a pulley 24 and a pulley 25, and rotates when at least one of the pulley 24 and the pulley 25 is driven by a motor (not illustrated). The medium is transported at a position facing the line head 22 while being attracted to a belt surface of the transport belt 23. As the attraction of the medium to the transport belt 23, a known attraction type such as an air suction type or an electrostatic attraction type can be adopted.

Furthermore, in the present embodiment, the medium transport path at the position facing the line head 22 extends along the horizontal direction.

The medium on which the recording is performed on the first surface by the line head 22 is sent by the transport roller pair 32 positioned downstream of the transport belt 23 toward either the transport roller pair 33 or the transport roller pair 36.

A path switching flap 41 is provided downstream of the transport roller pair 32, and the medium that receives the sending force from the transport roller pair 32 by the path switching flap 41 is sent toward either the transport roller pair 33 or the transport roller pair 36.

When recording is not performed on both the first surface of the medium and the second surface opposite to the first surface, that is, when double-sided recording is not performed, the medium is sent from the transport roller pair 32 toward the transport roller pair 33, and is ejected toward the ejection tray 5 through the medium transport path T2.

When recording is performed on both the first surface of the medium and the second surface opposite to the first surface, that is, when double-sided recording is performed, the medium is sent from the transport roller pair 32 toward the transport roller pair 36, and is sent off toward the medium transport path T3. After that, the rotational direction of the transport roller pair 36 is switched, the medium enters the medium transport path T4, and is sent to the transport roller pair 31 by the transport roller pairs 37, 38, and 39. Furthermore, a reference numeral 42 is a path switching flap for sending off the medium from the medium transport path T3 to the medium transport path T4.

The above is the medium transport path of the printer 1, and the first medium accommodating cassette 10 will be further described below.

As illustrated in FIGS. 2 and 3, the first medium accommodating cassette 10 includes the lower medium setting section 11 which is an example of a "medium accommodation section" and the upper medium setting section 12 which is an example of a "medium support section". The upper medium setting section 12 is provided above the lower medium setting section 11. In FIGS. 2 and 3, a reference numeral P1 indicates a medium set in the lower medium setting section 11, and a reference numeral P2 indicates a medium set in the upper medium setting section 12. A medium having a size larger in the feeding direction than that of the lower medium setting section 11 can be set in the upper medium setting section 12. In the present specification, a medium having a large size in the feeding direction may be referred to as a long medium.

Figure 4:
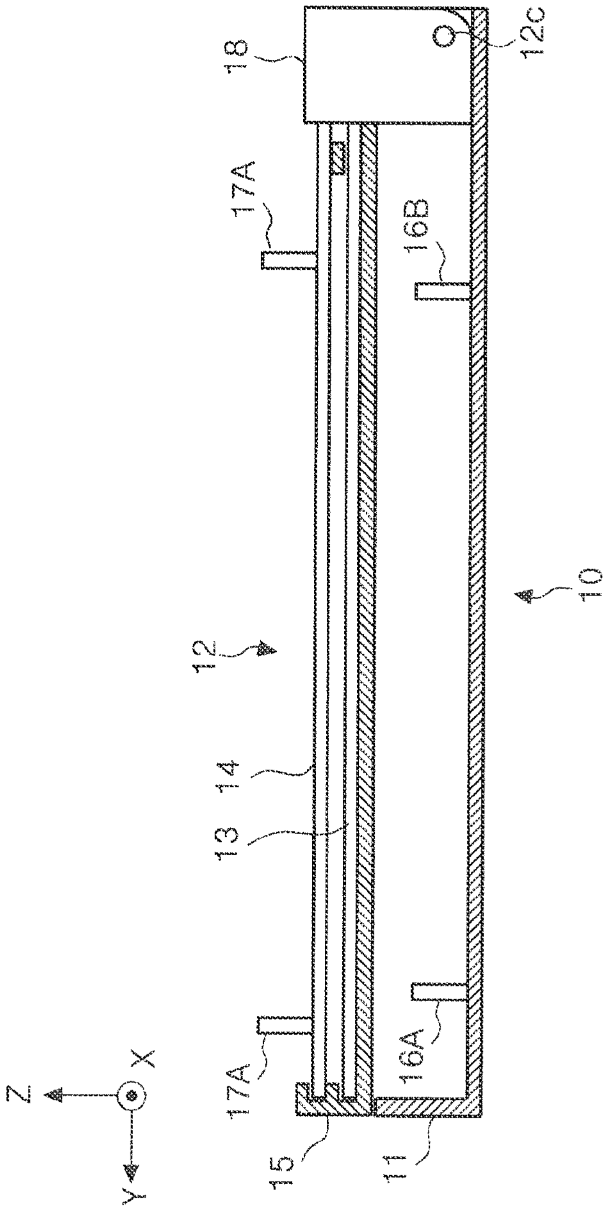
FIG. 4 is a sectional view of a first medium accommodating cassette cut along a Y-Z plane.

The lower medium setting section 11 is provided with edge guides 16A and 16B that regulate the edges of the medium, which is set as illustrated in FIG. 4, in the Y-axis direction, that is, in the width direction, so as to be displaceable in the width direction. Similarly, the upper medium setting section 12 is provided with edge guides 17A and 17B that regulate the edges of the set medium in the width direction, so as to be displaceable in the width direction.

The upper medium setting section 12 includes a first support tray 13 and a second support tray 14. As illustrated in FIG. 4, the first medium accommodating cassette 10 is provided with a tray support section 15 above the lower medium setting section 11, and the first support tray 13 and the second support tray 14 are supported to be slidable in the X-axis direction by the tray support section 15. Furthermore, in the drawings other than FIGS. 4 and 5, the tray support section 15 is not illustrated.

Figure 6:
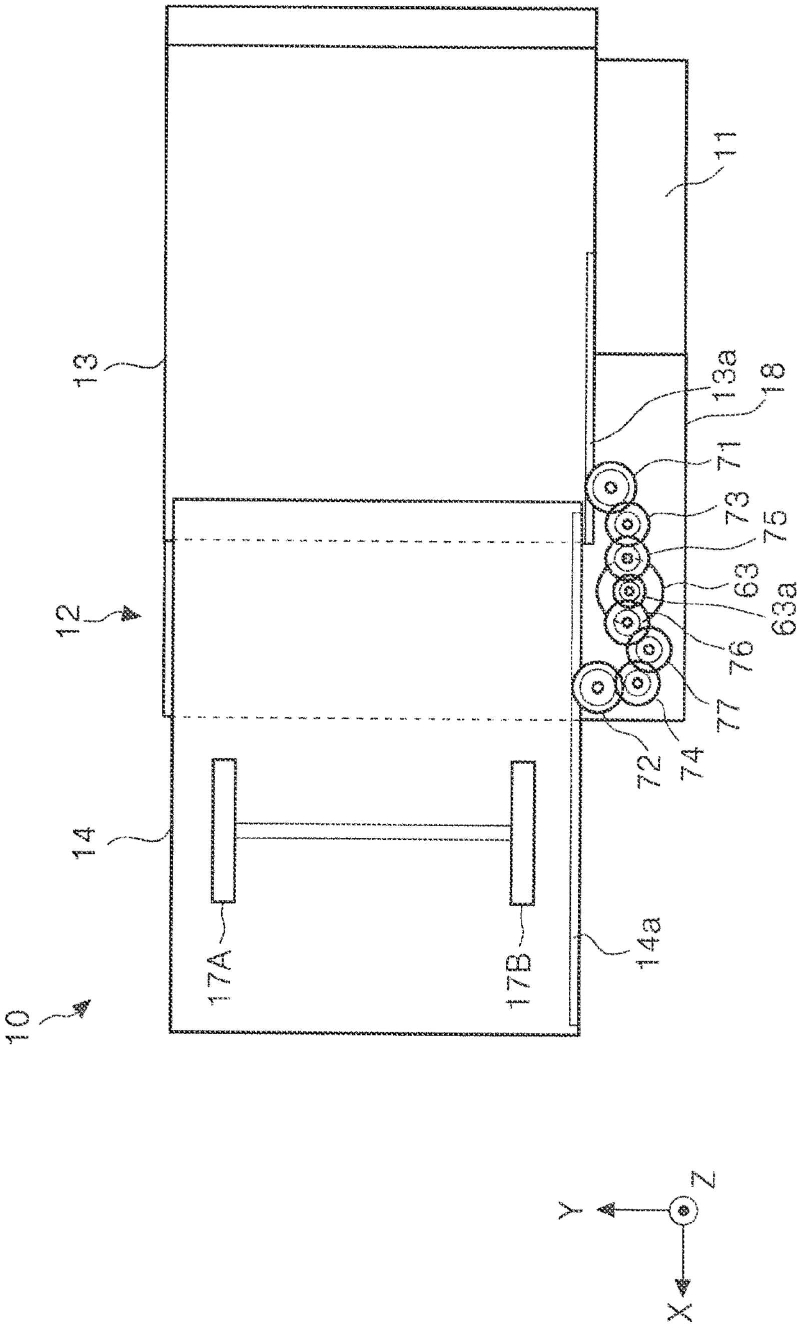
FIG. 6 is a plan view of the first medium accommodating cassette.

On the side surface of the first support tray 13 in the −Y direction, as illustrated in FIG. 6, a first rack section 13*a* is formed along the X-axis direction, a first pinion gear 71 meshes with the first rack section 13*a*, and a rack and pinion mechanism is configured with the first rack section 13*a* and the first pinion gear 71.

Similarly, on the side surface of the second support tray 14 in the −Y direction, a second rack section 14*a* is formed along the X-axis direction, a second pinion gear 72 meshes with the second rack section 14*a*, and the rack and pinion mechanism is configured with the second rack section 14*a* and the second pinion gear 72.

Furthermore, in the present embodiment, the racks that configure the rack and pinion mechanism are formed on the side surfaces of each tray, but may be formed on the surfaces in the +Z direction or the −Z direction.

In FIG. 6, a reference numeral 18 is a tray driving section provided in the −Y direction with respect to the upper medium setting section 12, and the first pinion gear 71 and the second pinion gear 72 configure the tray driving section 18. Further, the tray driving section 18 is provided with a tray driving motor 63. A driving gear 63*a* is provided on the rotation shaft of the tray driving motor 63. A spur gear 75 meshes with the driving gear 63*a*, a clutch gear 73 meshes with the spur gear 75, and the clutch gear 73 transmits the driving force of the tray driving motor 63 to the first pinion gear 71.

A spur gear 76 meshes with the driving gear 63*a*, a spur gear 77 meshes with the spur gear 76, a clutch gear 74 meshes with the spur gear 77, and the clutch gear 74 transmits the driving force of the tray driving motor 63 to the second pinion gear 72. Furthermore, the clutch gears 73 and 74 are gears that can idle when a predetermined torque or more is applied.

With the tray driving section 18 configured as described above, when the tray driving motor 63 rotates, the first pinion gear 71 and the second pinion gear 72 rotate, and the first support tray 13 and the second support tray 14 slide in the X-axis direction.

Here, since the rotational directions of the first pinion gear 71 and the second pinion gear 72 are opposite to each other, when the driving gear 63*a* rotates in the clockwise direction in FIG. 6, the first support tray 13 slides in the +X direction and the second support tray 14 slides in the −X direction. Conversely, when the driving gear 63*a* rotates in the counterclockwise direction in FIG. 6, the first support tray 13 slides in the −X direction, and the second support tray 14 slides in the +X direction.

FIG. 2 illustrates a case where the upper medium setting section 12 is in the stored state, and when the first support tray 13 slides in the −X direction and the second support tray 14 slides in the +X direction from this state, the second support tray 14, which is an upstream part of the upper medium setting section 12, protrudes from the first side surface 2*a* of the apparatus main body 2 in the +X direction as illustrated in the change from FIG. 2 to FIG. 3. This state is a protruding state of the upper medium setting section 12, and the support surface 12*a*, which is the upper surface of the upper medium setting section 12, is in a state of being expanded to be the longest in the X-axis direction. Then, the medium P2 set in the upper medium setting section 12 faces the feeding roller 50, and the medium P2 can be fed by the feeding roller 50.

Further, when the first support tray 13 is displaced in the +X direction and the second support tray 14 slides in the −X direction from the protruding state of the upper medium setting section 12 illustrated in FIG. 3, a state where the second support tray 14 is stored inside the apparatus main body 2 as illustrated in the change from FIG. 3 to FIG. 2. This state is a stored state of the upper medium setting section 12. In the stored state of the upper medium setting section 12, the upper medium setting section 12 does not face the feeding roller 50, the feeding roller 50 faces the lower medium setting section 11, and the medium P1 set in the lower medium setting section 11 can be fed by the feeding roller 50.

Furthermore, the movement limit in the +X direction and the movement limit in the −X direction of each of the first support tray 13 and the second support tray 14 are regulated by a regulation section (not illustrated).

Furthermore, in the present embodiment, the first support tray 13 and the second support tray 14 are driven by one tray driving motor 63, but motors may be provided for each of the first support tray 13 and the second support tray 14 to be independently driven.

In addition, in the present embodiment, the upper medium setting section 12 is configured with two trays, that is, the first support tray 13 and the second support tray 14, but can also be configured with three or more trays.

Figure 5:
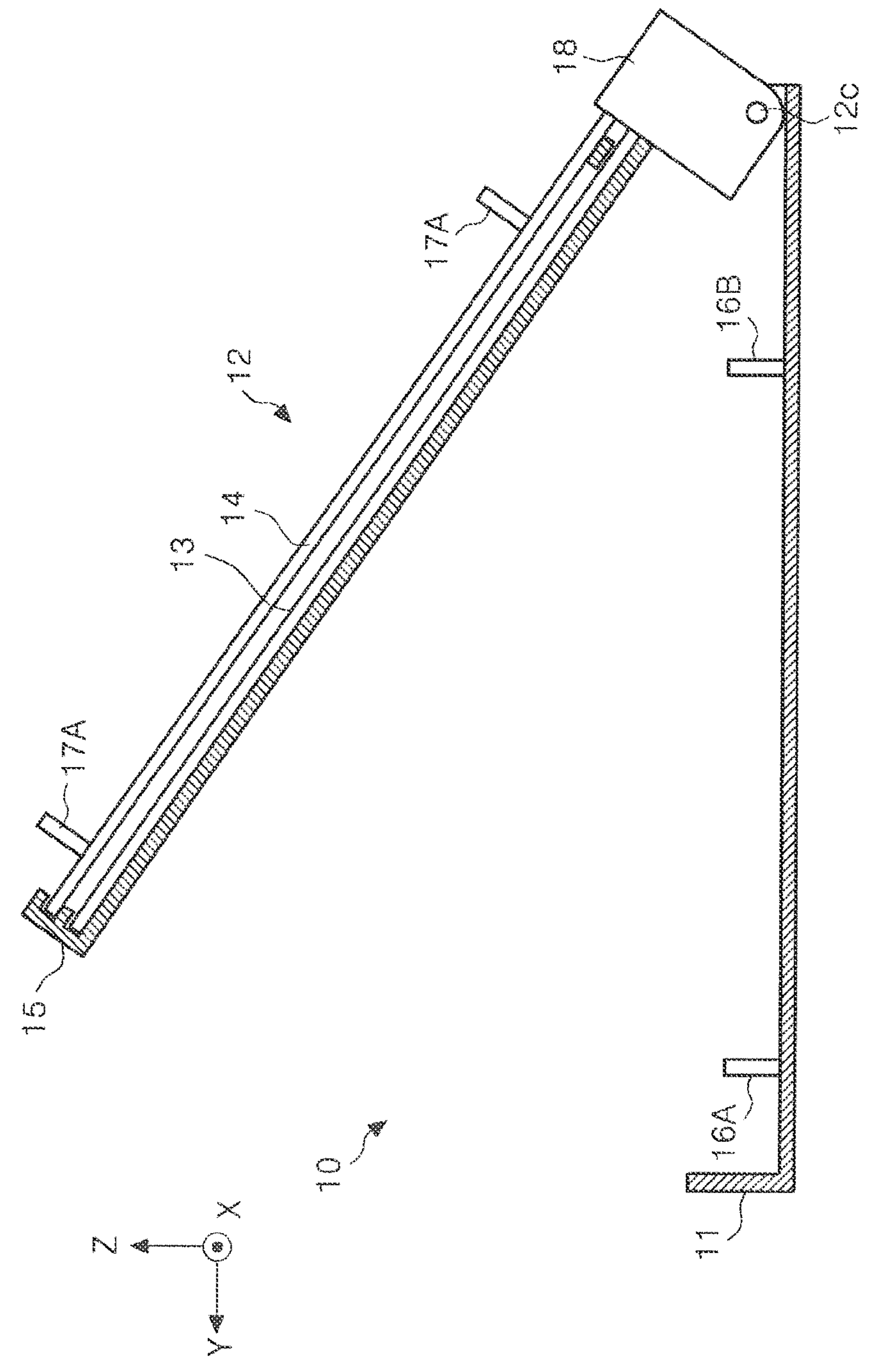
FIG. 5 is a sectional view of the first medium accommodating cassette cut along a Y-Z plane.

Next, the tray driving section 18 is provided integrally with the tray support section 15 that supports the first support tray 13 and the second support tray 14, and accordingly, the upper medium setting section 12 can rotate around the rotation shaft 12*c* as illustrated in FIGS. 4 and 5. The rotation shaft 12*c* is a rotation shaft having a shaft center parallel to the X-axis direction. As the tray driving section 18, the first support tray 13, the second support tray 14, and the tray support section 15 integrally rotate, the meshing state of the first pinion gear 71 and the first rack section 13*a* is maintained, and the meshing state of the second pinion gear 72 and the second rack section 14*a* is maintained.

Then, as the upper medium setting section 12 rotates, the upper medium setting section 12 opens and closes the upper portion of the lower medium setting section 11, the upper medium setting section 12 opens the upper portion of the lower medium setting section 11, and accordingly, it is possible to easily access to the lower medium setting section 11.

Figure 7:
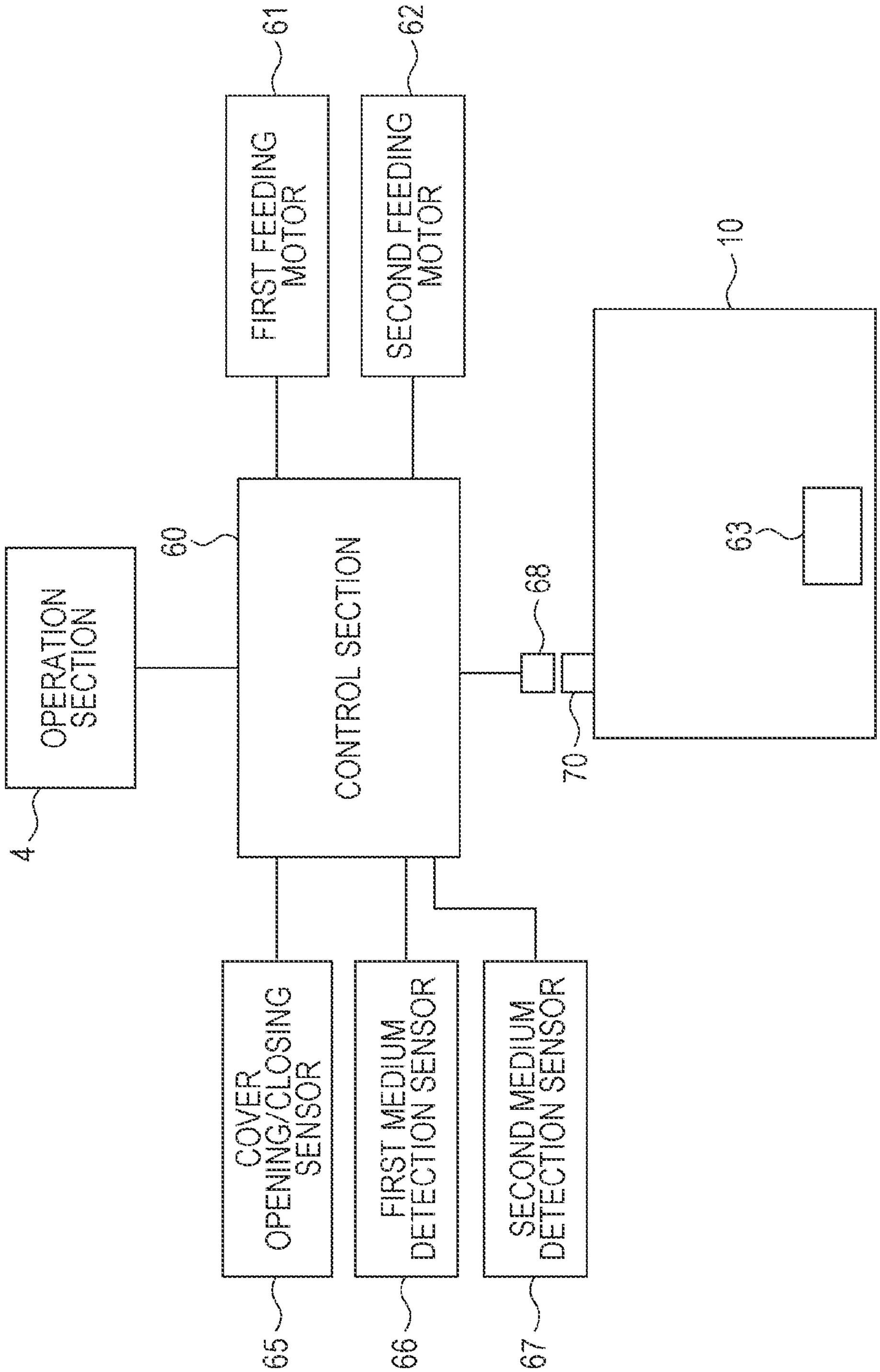
FIG. 7 is a block diagram illustrating a control system of a feeding mechanism of the printer.

Next, FIG. 7 is a block diagram illustrating a control system of the feeding mechanism. The control section 60 includes a CPU, a non-volatile memory, and the like (not illustrated), and stores programs, parameters, and the like for performing various controls in the non-volatile memory.

A signal related to operation information is input to the control section 60 from the operation section 4, and a signal related to the display content of the display section 4*a* (refer to FIG. 1) is output from the control section 60 to the operation section 4.

Further, the detection signals of a cover opening/closing sensor 65, a first medium detection sensor 66, and a second medium detection sensor 67 are input to the control section 60.

The cover opening/closing sensor 65 is a sensor for detecting the open/closed state of the side cover 6 (refer to FIGS. 2 and 3), and the control section 60 can detect whether the side cover 6 is in a closed state or an open state based on the detection signal of the cover opening/closing sensor 65.

The first medium detection sensor 66 is a sensor provided in the vicinity of the downstream of the separation roller pair 45 (refer to FIGS. 2 and 3), and the control section 60 can detect the passage of the front end of the medium and the rear end of the medium at the position of the first medium detection sensor 66 based on the detection signal of the first medium detection sensor 66.

In addition, the second medium detection sensor 67 is a sensor provided in the vicinity of the downstream of the transport roller pair 29 (refer to FIGS. 2 and 3), and the control section 60 can detect the passage of the front end of the medium and the rear end of the medium at the position of the second medium detection sensor 67 based on the detection signal of the second medium detection sensor 67.

Furthermore, a plurality of other medium detection sensors (not illustrated) are provided in the medium transport path of the printer 1, but the description thereof will be omitted.

The control section 60 controls a first feeding motor 61 and a second feeding motor 62. The first feeding motor 61 is a driving source for the feeding roller 50 (refer to FIGS. 2 and 3), and the second feeding motor 62 is a power source for an assist roller 55 (refer to FIGS. 2 and 3) described later. Furthermore, in the present embodiment, the feeding roller 50 and the assist roller 55 are respectively provided with independent motors, but it is also possible to configure the feeding roller 50 and the assist roller 55 to be driven by one motor.

The driving force of the first feeding motor 61 is transmitted to the rotation shaft 52 via a power transmission mechanism (not illustrated), and is transmitted from the rotation shaft 52 to the feeding roller 50 via a power transmission mechanism (not illustrated). When the first feeding motor 61 rotates in the normal direction, the arm member 51 swings in the clockwise direction of FIGS. 2 and 3, and the feeding roller 50 is put into a contact state of being in contact with the medium set in the lower medium setting section 11 or the upper medium setting section 12. In addition, when the first feeding motor 61 rotates in the reverse direction, the arm member 51 swings in the counterclockwise direction of FIGS. 2 and 3, and the feeding roller 50 is put into a state of being positioned at the uppermost part as illustrated by a two-dot chain line of FIG. 2, that is, a separated state of being separated from the medium set in the lower medium setting section 11 or the upper medium setting section 12.

Next, the second feeding motor 62 is a driving source for the assist roller 55 (refer to FIGS. 2 and 3). Here, the assist roller 55 will be described.

The assist roller 55 is supported by an arm member 56. The arm member 56 is provided to be swingable around a rotation shaft 57 and swings, and accordingly, the assist roller 55 advances and retreats with respect to the upper medium setting section 12. The advancing/retreating direction of the assist roller 55 with respect to the upper medium setting section 12 is a direction substantially along the Z axis.

Furthermore, one assist roller 55 is provided to be in contact with the center position of the medium set in the upper medium setting section 12 in the X-axis direction, that is, the medium width direction. However, a plurality of assist rollers 55 may be provided along the medium width direction so that the feeding rollers 50 are in contact with the medium at a plurality of positions of which center positions are symmetrical in the medium width direction.

The driving force of the second feeding motor 62 is transmitted to the rotation shaft 57 via a power transmission mechanism (not illustrated), and is transmitted from the rotation shaft 57 to the assist roller 55 via a power transmission mechanism (not illustrated). When the second feeding motor 62 rotates in the normal direction, the arm member 56 swings in the clockwise direction of FIGS. 2 and 3, and the assist roller 55 is put into a contact state of being in contact with the medium set in the upper medium setting section 12. In addition, when the second feeding motor 62 rotates in the reverse direction, the arm member 56 swings in the counterclockwise direction of FIGS. 2 and 3, and the assist roller 55 is put into a state of being positioned at the uppermost part as illustrated in FIG. 2, that is, a separated state of being separated from the medium set in the upper medium setting section 12.

Furthermore, the control section 60 puts the feeding roller 50 and the assist roller 55 to be in the separated state, in a standby state before feeding the medium. Further, the feeding roller 50 and the assist roller 55 are in the separated state during the switching from the stored state to the protruding state or the switching from the protruding state to the stored state of the upper medium setting section 12.

The assist roller 55 is provided with a one-way clutch 58. The one-way clutch 58 transmits the driving force of the second feeding motor 62 to the assist roller 55, but the assist roller 55 is idled in the rotational direction when the assist roller 55 sends the medium in the feeding direction, specifically, the counterclockwise direction of FIG. 3. Accordingly, the assist roller 55 can idle in the counterclockwise direction of FIG. 3 at a rotation speed higher than the rotation speed of driving by the second feeding motor 62.

In the present embodiment, the peripheral speed of the feeding roller 50 is set to be lower than the peripheral speed of the assist roller 55. Therefore, when slip does not occur between the feeding roller 50 and the medium, the action of the one-way clutch 58 causes the assist roller 55 to be in contact with the medium and rotates in a driven manner. At this time, the driving force of the second feeding motor 62 does not act on the assist roller 55. On the other hand, when slip occurs between the feeding roller 50 and the medium and the medium sending speed by the feeding roller 50 decreases, the driving force of the second feeding motor 62 acts on the assist roller 55, and the assist roller 55 applies a sending force to the medium.

Next, when the first medium accommodating cassette 10 is provided with a cassette coupling section 70 and the first medium accommodating cassette 10 is mounted on the apparatus main body 2, the cassette coupling section 70 is fitted to a main body coupling section 68 provided on the apparatus main body 2. The cassette coupling section 70 and the main body coupling section 68 are configured with a connector for realizing electrical coupling, the cassette coupling section 70 is coupled to the main body coupling section 68, and accordingly, power is supplied from the apparatus main body 2 to the tray driving motor 63, and the control by the control section 60 can be executed.

Furthermore, the control section 60 can grasp whether the upper medium setting section 12 is in the stored state (FIG. 2) or the protruding state (FIG. 3) based on the rotational direction of the tray driving motor 63. In addition, when it is desired to check the state of the upper medium setting section 12 such as when the power is turned on or when returning from the power saving mode, the tray driving motor 63 may be driven in the direction in which the upper medium setting section 12 switches to the stored state. Accordingly, it is confirmed that the upper medium setting section 12 is in the stored state.

However, it is needless to say that a sensor for detecting the state of the upper medium setting section 12 may be provided, and the state of the upper medium setting section 12 may be grasped based on the sensor.

Figure 8:
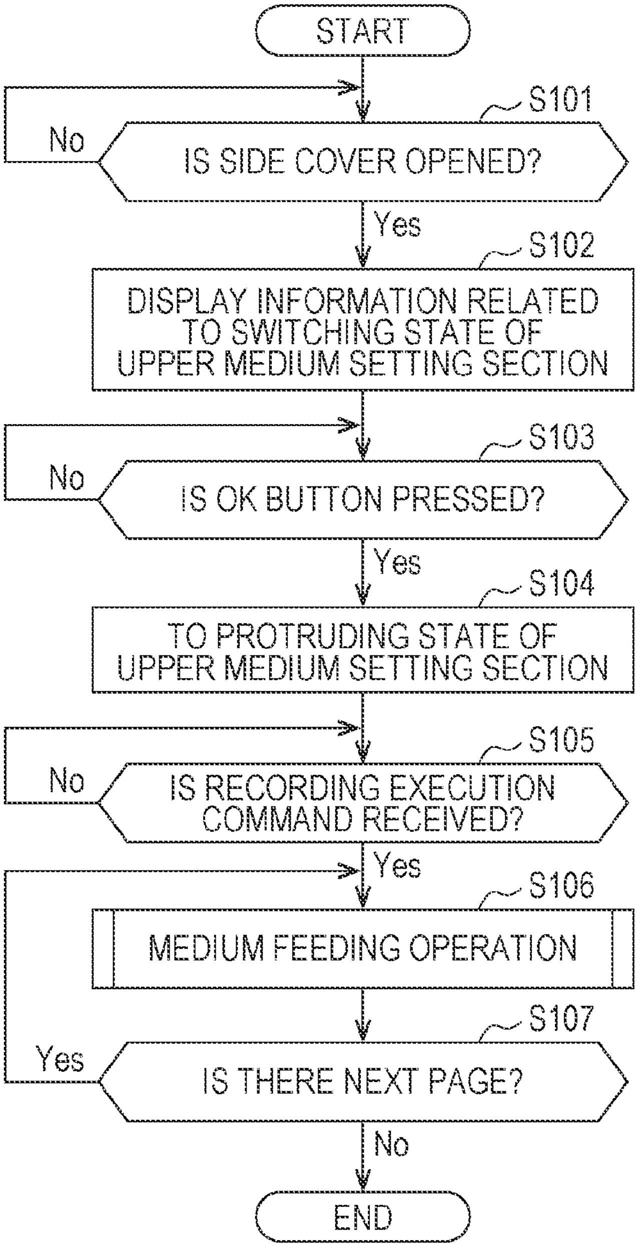
FIG. 8 is a flowchart illustrating a control flow when a side cover is opened.

In the printer 1 having the above-described configuration, the control section 60 performs the process illustrated in FIG. 8 according to the open/closed state of the side cover 6. When the side cover 6 is opened from the closed state (Yes in step S101), the control section 60 displays information related to switching from the stored state to the protruding state of the upper medium setting section 12 on the display section 4*a* of the operation section 4 (step S102). The information display related to switching from the stored state to the protruding state of the upper medium setting section 12 can display, for example, a message, such as "The tray protrudes from the left side surface of the apparatus. Are you sure to proceed?". On the other hand, when the user presses the OK button (Yes in step S103), the control section 60 drives the tray driving motor 63 to switch the upper medium setting section 12 from the stored state to the protruding state (step S104). Furthermore, when the side cover 6 is closed in a state where the information related to the switching from the stored state to the protruding state of the upper medium setting section 12 is displayed, the control section 60 clears the above-described information display displayed on the display section 4*a*, and returns the display to the home screen.

Then, when the control section 60 receives a recording execution command (Yes in step S105), the control section 60 executes a medium feeding operation (step S106). After that, the medium feeding operation is repeatedly executed until there are no more next pages (Yes in step S107).

Next, the medium feeding operation in step S106 will be described with reference to FIG. 9. The control section 60 drives the first feeding motor 61 and the second feeding motor 62 in the normal rotation, and switches the feeding roller 50 and the assist roller 55 in the separated state to the contact state (step S201). Accordingly, the medium placed on the upper medium setting section 12 is sent out downstream in the feeding direction.

Furthermore, at this time, when the medium is not placed on the upper medium setting section 12, the feeding roller 50 and the assist roller 55 are in contact with the support surface 12*a* of the upper medium setting section 12, and thus, the driving current values of the first feeding motor 61 and the second feeding motor 62 increase. Therefore, when the driving current values of the first feeding motor 61 and the second feeding motor 62 exceed a predetermined threshold value, the control section 60 stops driving the first feeding motor 61 and the second feeding motor 62, and then, an error message such as "Please check the condition of the paper" can also be displayed on the display section 4*a*.

However, it is needless to say that a sensor for detecting the presence or absence of the medium on the upper medium setting section 12 may be separately provided.

Furthermore, of the first feeding motor 61 and the second feeding motor 62, when only the driving current value of the second feeding motor 62 exceeds a predetermined threshold value, it is assumed that a medium having a smaller size in the feeding direction is set. Therefore, in this case, only the second feeding motor 62 is stopped to be driven, and then the feeding operation is continued.

Next, when the front end of the sent-out medium is detected by the first medium detection sensor 66 (Yes in step S202), that is, when the medium is nipped by the separation roller pair 45, the control section 60 rotates the first feeding motor 61 and the second feeding motor 62 by a predetermined amount in the reverse direction, and the feeding roller 50 and the assist roller 55 are switched from the contact state to the separated state, and then stopped (step S203). Accordingly, it is possible to avoid a case where the feeding roller 50 and the assist roller 55 become a transport load for the medium sending operation by the separation roller pair 45.

Furthermore, there is a high possibility that the medium sent out from the upper medium setting section 12 is long, and a high transport force is required. Therefore, for example, after the front end of the medium is detected by the second medium detection sensor 67 further downstream of the first medium detection sensor 66, that is, after the medium is nipped by the two roller pairs, such as the separation roller pair 45 and the transport roller pair 29, the first feeding motor 61 and the second feeding motor 62 may be stopped. In this case, it is also preferable to perform control as described in the following so that the feeding roller 50 and the assist roller 55 do not become a transport load for the medium sending operation by the separation roller pair 45. For example, when the front end of the medium is detected by the first medium detection sensor 66, the driving speeds of the first feeding motor 61 and the second feeding motor 62 may increase so that the medium sending speed by the feeding roller 50 and the assist roller 55 becomes higher than or at least equal to the medium sending speed by the separation roller pair 45, until the front end of the medium is detected by the second medium detection sensor 67.

As described above, the upper medium setting section 12 can switch between the stored state of being stored in the apparatus main body 2 (FIG. 2) and the protruding state, which is a state where a part of the second support tray 14 which is an upstream part in the feeding direction protrudes from the first side surface 2*a* of the apparatus main body 2, that is, a state where the support surface 12*a* is expanded from the stored state (FIG. 3). Then, as illustrated in FIG. 3, in the protruding state of the upper medium setting section 12, the downstream end 12*b* of the support surface 12*a* in the feeding direction is at a position close to the second side surface 2*b* between the first side surface 2*a* and the second side surface 2*b* opposite to the first side surface 2*a*.

A case where the downstream end 12*b* of the support surface 12*a* in the feeding direction is at a position close to the second side surface 2*b* between the first side surface 2*a* and the second side surface 2*b*, means a case where the downstream end 12*b* is further on the second side surface 2*b* side than an intermediate position Xc between the first side surface 2*a* and the second side surface 2*b*.

With such a configuration, the support surface 12*a* extends in the feeding direction by utilizing the space in the apparatus main body 2. Therefore, in the protruding state of the upper medium setting section 12, it is possible to suppress a protrusion amount W2 of the upper medium setting section 12 from the first side surface 2*a*, and accordingly, it is possible to feed a long medium by ensuring a length (W1+W2) of the support surface 12*a* in the feeding direction while suppressing the installation space of the apparatus, and the usability of the apparatus is improved.

Further, the first medium accommodating cassette 10 is provided to be attachable to and detachable from the apparatus main body in the −Y direction, that is, from the front surface side, and the upper medium setting section 12 can protrude in the +X direction, that is, laterally with respect to the apparatus main body 2. Therefore, while facilitating efficiency when attaching and detaching the first medium accommodating cassette 10, even when the protrusion amount of the upper medium setting section 12 from the apparatus main body 2 is ensured, the upper medium setting section 12 is unlikely to be an obstacle.

In addition, the first medium accommodating cassette 10 provided with the lower medium setting section 11 is provided to be attachable to and detachable from the apparatus main body 2, and the upper medium setting section 12 is provided in the first medium accommodating cassette 10. Therefore, jam treatment can be easily performed by removing the first medium accommodating cassette 10 when medium jam occurs inside the apparatus.

Furthermore, it is needless to say that the upper medium setting section 12 is not integrally formed with the first medium accommodating cassette 10, but may be provided independently in the apparatus main body 2.

Further, the upper medium setting section 12 is slidably provided with respect to the first medium accommodating cassette 10, and as the upper medium setting section 12 slides, the upper medium setting section 12 switches between the stored state and the protruding state. Therefore, it is possible to easily switch between the protruding state and the stored state.

Furthermore, in the present embodiment, the upper medium setting section 12 is configured to slide along the horizontal direction, but may be configured to be inclined upward in the +X direction in the protruding state.

Further, the feeding roller 50 is provided to be displaceable in the direction of advancing and retreating with respect to the first medium accommodating cassette 10, the medium can be fed from the lower medium setting section 11 by the feeding roller 50 in the stored state of the upper medium setting section 12, and the medium can be fed from the upper medium setting section 12 by the feeding roller 50 in the protruding state of the upper medium setting section 12. Accordingly, the feeding roller 50 is used for both sending out the medium from the upper medium setting section 12 and sending out the medium from the lower medium setting section 11. Therefore, it is possible to suppress an increase in the cost of the apparatus as compared with a configuration in which separated feeding rollers are provided for the upper medium setting section 12 and the lower medium setting section 11.

The upper medium setting section 12 includes the first support tray 13 and the second support tray 14 positioned upstream of the first support tray 13 in the feeding direction in the protruding state. Therefore, it is possible to increase the size of the support surface 12*a* in the feeding direction, and to support a long medium.

Further, the apparatus main body 2 includes the tray driving motor 63 which is a power source for sliding the upper medium setting section 12, and the upper medium setting section 12 switches between the protruding state and the stored state by the power of the tray driving motor 63. Therefore, it is not necessary for the user to operate the upper medium setting section 12 by himself or herself, and the usability of the apparatus is improved.

Further, the apparatus main body 2 includes the side cover 6 which is provided to be openable and closable on the first side surface 2*a*, and can make the upper medium setting section 12 protrude from the first side surface 2*a* by being opened; and the cover opening/closing sensor 65 that outputs information related to the open/closed state of the side cover 6. Then, the control section 60 that controls the tray driving motor 63 displays information related to the switching from the stored state to the protruding state of the upper medium setting section 12 on the display section 4*a* when the side cover 6 is open when the upper medium setting section 12 is in the stored state, based on the detection information of the cover opening/closing sensor 65. Accordingly, the usability is improved.

Furthermore, although the side cover 6 is provided for the apparatus main body 2 in the present embodiment, the side cover 6 may be provided integrally with the upper medium setting section 12, for example.

Furthermore, the control section 60 may switch the upper medium setting section 12 from the stored state to the protruding state when the side cover 6 is open when the upper medium setting section 12 is in the stored state, based on the detection information of the cover opening/closing sensor 65. Accordingly, the operation for switching the upper medium setting section 12 from the stored state to the protruding state becomes unnecessary, and the usability of the apparatus is improved.

Further, as described above, as illustrated in FIG. 3, in the protruding state of the upper medium setting section 12, the downstream end 12*b* of the support surface 12*a* in the feeding direction is at a position close to the second side surface 2*b* between the first side surface 2*a* and the second side surface 2*b*, that is, the upper medium setting section 12 is inserted into the apparatus main body 2. Therefore, on the inside of the apparatus main body 2, the assist roller 55 that applies the sending force to the medium fed from the upper medium setting section 12 can be provided upstream of the feeding roller 50. Accordingly, it is possible to suppress a shortage of sending force when feeding a long medium, and it is possible to realize an appropriate feeding.

Furthermore, although one assist roller 55 is provided upstream of the feeding roller 50 in the present embodiment, a plurality of assist rollers 55 may be provided upstream of the feeding roller 50 along the feeding direction.

Further, the feeding roller 50 and the assist roller 55 can switch between the contact state of being in contact with the medium supported by the upper medium setting section 12 and the separated state of being separated from the medium supported by the upper medium setting section 12. Therefore, by putting the feeding roller 50 and the assist roller 55 into the separated state after the feeding of the medium is completed (step S203 in FIG. 9), it is possible to avoid a case where the feeding roller 50 and the assist roller 55 cause a transport load.

Figure 9:
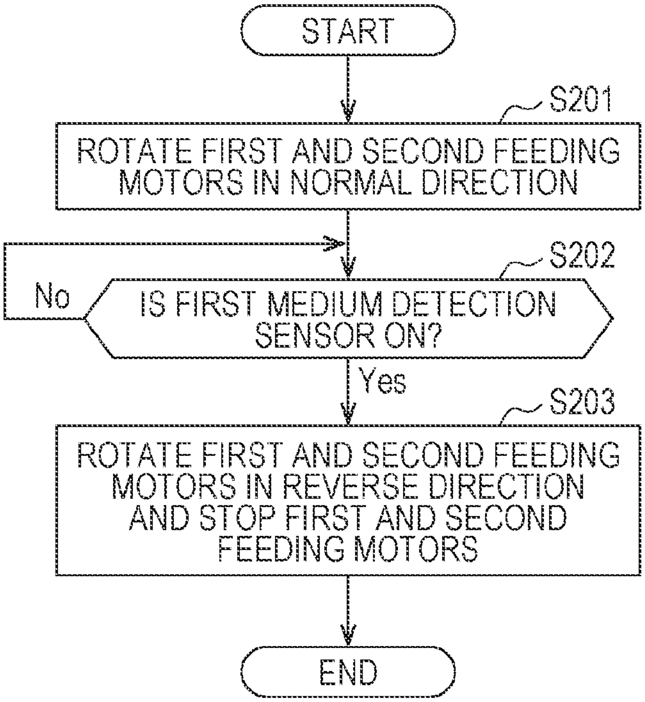
FIG. 9 is a flowchart illustrating a part of control at the time of feeding a medium.

Further, when the front end of the medium sent out from the upper medium setting section 12 is nipped by the separation roller pair 45, the control section 60 switches the feeding roller 50 and the assist roller 55 from the contact state to the separated state (Yes in step S202, step S203 in FIG. 9). Therefore, when the medium is transported by the separation roller pair 45, it is possible to avoid a case where the feeding roller 50 and the assist roller 55 cause a transport load.

Further, the peripheral speed of the assist roller 55 is set to be lower than the peripheral speed of the feeding roller 50. Therefore, it is possible to suppress a case where the medium is excessively sent by the assist roller 55 and the medium is bent between the feeding roller 50 and the assist roller 55.

Further, in the power transmission path between the second feeding motor 62, which is the power source of the assist roller 55, and the assist roller 55, the one-way clutch 58 that idles the assist roller 55 in the rotational direction when the medium is sent in the feeding direction is provided. Therefore, it is possible to suppress a case where the assist roller 55 becomes a transport load with respect to the medium sending by the feeding roller 50.

Figure 10:
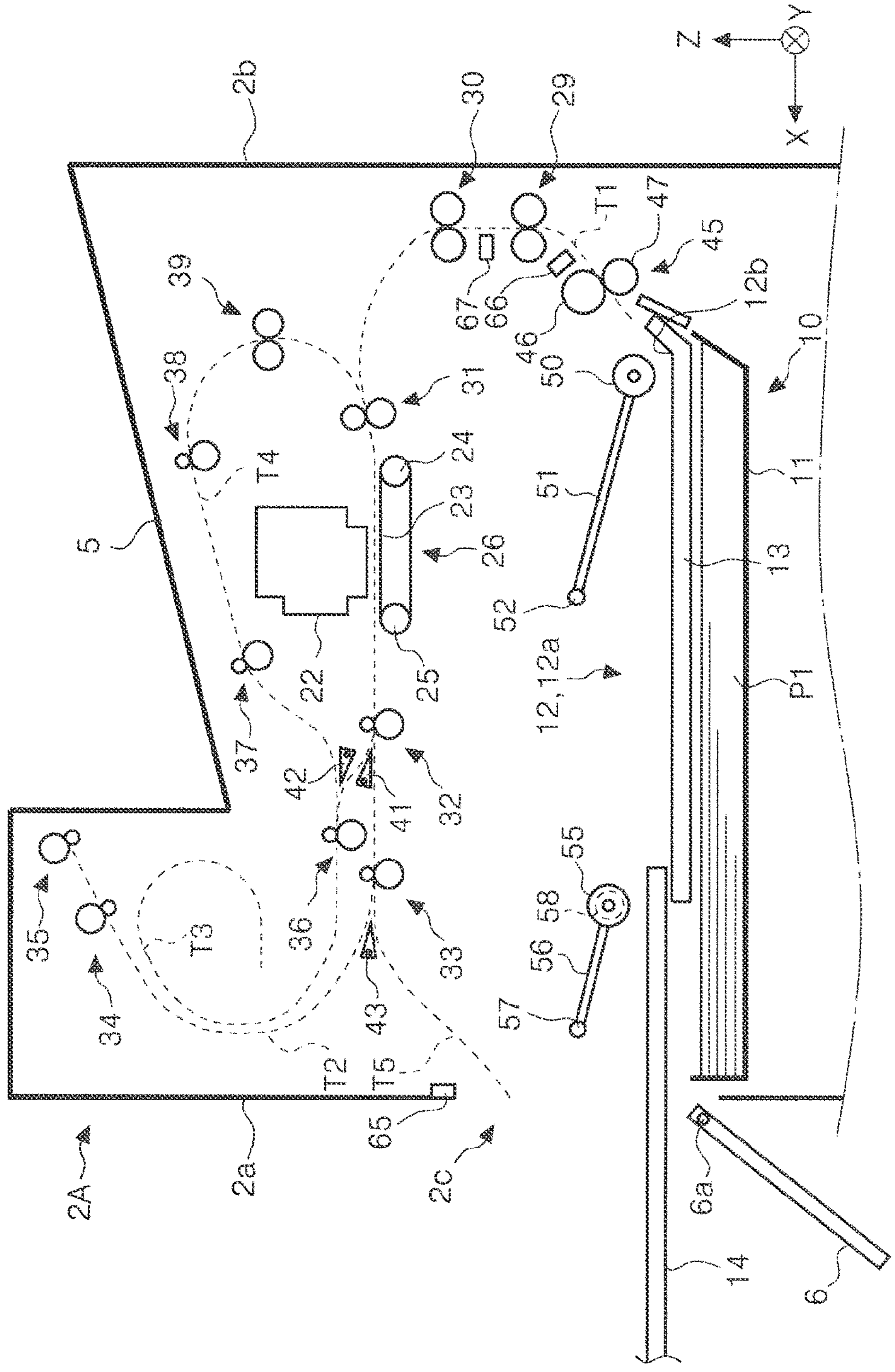
FIG. 10 is a view illustrating a medium transport path of the printer when the upper medium setting section functions as an ejection tray.

Furthermore, the upper medium setting section 12 can also serve as an ejection tray that supports the medium ejected after recording is performed. An apparatus main body 2A illustrated in FIG. 10 includes a path switching flap 43 downstream of the transport roller pair 33, and further includes a medium transport path T5 facing downward downstream of the path switching flap 43 in addition to the above-described medium transport path T3 facing upward. The path switching flap 43 switches the transport destination of the medium to either the medium transport path T3 or the medium transport path T5. The medium sent to the medium transport path T5 can be ejected from the opening portion 2*c* in the +X direction, and is supported at a part of the upper medium setting section 12 in the protruding state that protrudes from the first side surface 2*a* in the +X direction.

Furthermore, in this manner, the upper medium setting section 12 can also serve as an ejection tray that supports the medium ejected after recording is performed, but the upper medium setting section 12 can also function as a configuration dedicated to the ejection tray.

The disclosure is not limited to the embodiments described above, and various modifications are possible within the range of the disclosure described in the range of the claims, and it is needless to say that the modifications are included within the range of the disclosure.

What is claimed is:

1. A recording apparatus comprising:

a medium accommodation section that accommodates a first medium;

a medium support section provided above the medium accommodation section, that includes a first support tray and a second support tray, wherein the first support tray and the second support tray forms a support surface that supports a second medium which is longer than the first medium;

a feeding roller that sends out the first medium and the second medium in a feeding direction; and an apparatus main body including the medium accommodation section, the medium support section and the feeding roller, wherein the medium support section is configured to switch between a stored state of being stored in the apparatus main body and a protruding state being a state where the second support tray protrudes in a direction opposite the feeding direction from a first side surface which is one of side surfaces that form a periphery of the apparatus main body, in the protruding state of the medium support section, the first support tray moves in the feeding direction close to a second side surface, which is a side surface opposite to the first side surface, between the first side surface and the second side surface, in the protruding state, the medium support section supports the second medium, set in the medium support section, and an assist roller contacts and applies a sending force to the second medium set in the medium support section in the protruding state, does not contact the first medium in the stored state, and is provided upstream of and separated from the feeding roller in the feeding direction.

2. The recording apparatus according to claim 1, wherein the feeding roller and the assist roller are provided to be switchable between a contact state of being in contact with the second medium supported by the medium support section in the protruding state and a separated state of being separated from the first medium supported by the medium support section.

3. The recording apparatus according to claim 2, further comprising:

a separation roller pair provided downstream of the feeding roller in the feeding direction for nipping and separating the first medium or the second medium, wherein a control section that controls rotation of the feeding roller and the assist roller switches the feeding roller and the assist roller from the contact state to the separated state when a front end of the second medium sent out from the medium support section is nipped by the separation roller pair.

4. The recording apparatus according to claim 1, wherein a peripheral speed of the assist roller is set to be lower than a peripheral speed of the feeding roller.

5. The recording apparatus according to claim 4, further comprising:

a one-way clutch that idles the assist roller in a rotational direction when the long-second medium is sent in the feeding direction.

6. The recording apparatus according to claim 1, further comprising:

a medium accommodating cassette provided with a medium accommodation section for accommodating the first medium is provided to be attachable to and detachable from the apparatus main body, wherein the medium support section is configured to protrude laterally with respect to the apparatus main body.

7. The recording apparatus according to claim 1, further comprising:

a medium accommodating cassette provided with a medium accommodation section for accommodating the first medium is provided to be attachable to and detachable from the apparatus main body, wherein the medium support section is provided in the medium accommodating cassette.

8. The recording apparatus according to claim 7, wherein the medium support section is slidably provided with respect to the medium accommodating cassette, and as the medium support section slides, the medium support section switches between the stored state and the protruding state.

9. The recording apparatus according to claim 8, wherein the feeding roller is provided to be displaceable in a direction of advancing and retreating with respect to the medium accommodating cassette, in the stored state of the medium support section, the first medium is feedable from the medium accommodation section by the feeding roller, and in the protruding state of the medium support section, the second medium is feedable from the medium support section by the feeding roller.

* * * * *